May 25, 1943.   B. F. PALMER   2,320,192
TOP CENTER INDICATOR FOR PISTONS
Filed March 2, 1942
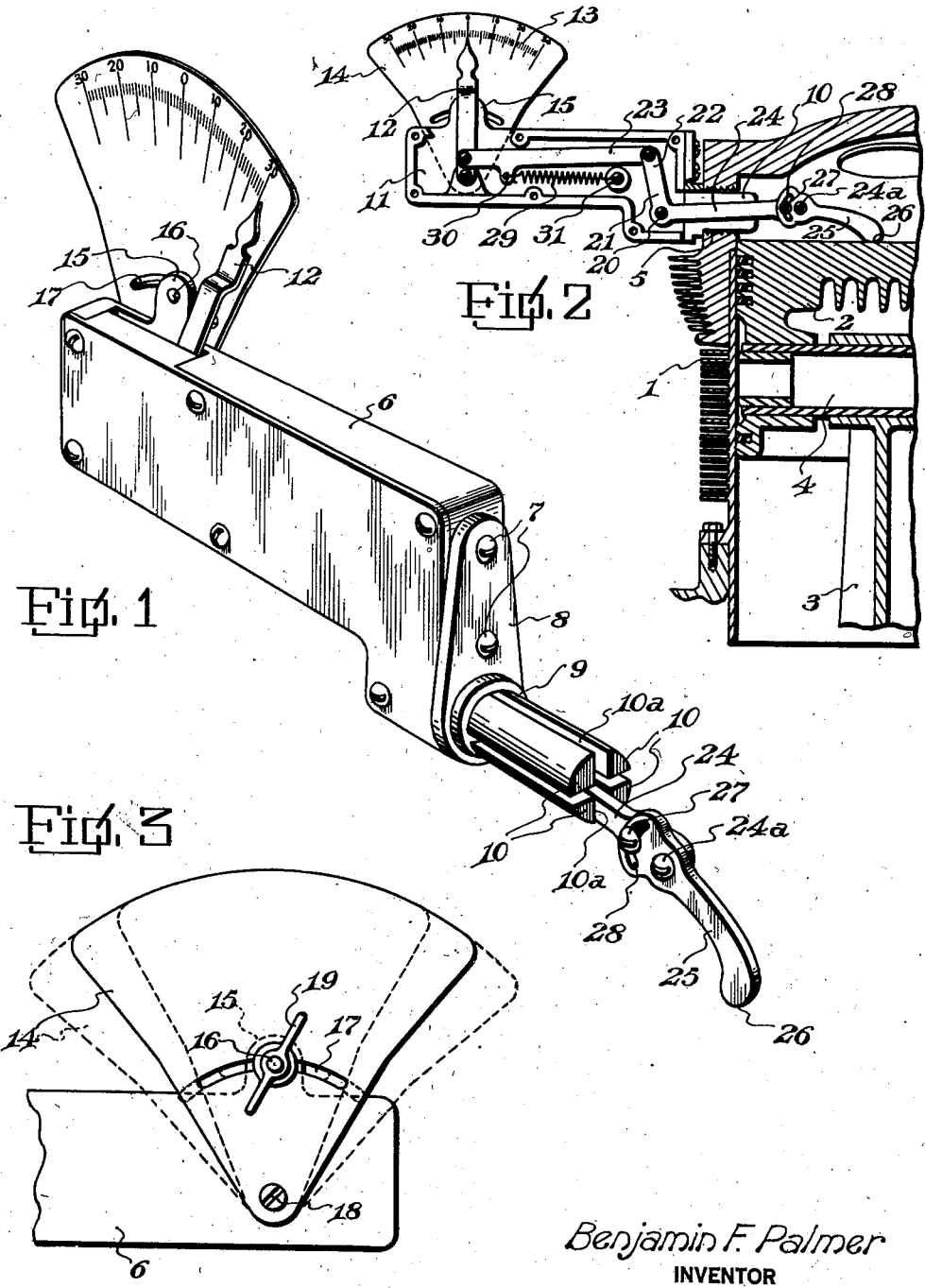
Benjamin F. Palmer
INVENTOR
BY Philip A. H. Sewell
ATTORNEY Patented May 25, 1943

2,320,192

UNITED STATES PATENT OFFICE 2,320,192

TOP CENTER INDICATOR FOR PISTONS

Benjamin F. Palmer, Tulsa, Okla.

Application March 2, 1942, Serial No. 433,102

5 Claims. (Cl. 33—172)

The invention relates to indicators adapted to be inserted into a cylinder into the path of a piston and having means with which the piston cooperates for indicating when the piston is at the extreme top of its stroke, thereby allowing the accurate adjustment of the timing mechanism of the engine.

A further object is to provide a top center indicator, which may be inserted in a spark plug opening, and supported in said opening and provided with means in the path of the piston for operating an indicator pointer cooperating with a scale outside the cylinder, and by means of which indicator pointer and scale the operator can easily ascertain when the piston is at the extreme top of its stroke thereby allowing accurate timing of the engine.

A further object is to provide the indicator casing with a split extension forming a plurality of spring arms for frictionally engaging in the spark plug hole for rigidly supporting the device.

A further object is to provide a bell crank lever within the indicator casing having a link connection to the pointer, and one of its arms extending through the slotted extension in the spark plug hole.

A further object is to provide the arm of the bell crank lever extending into the cylinder with an adjustable arm adapted to be engaged by the piston, and spring means whereby the adjustable arm is normally forced downwardly towards the piston.

A further object is to provide a top center indicator which may be easily adjusted for use in connection with one engine and after being properly adjusted may be used in connection with other engines of the same type without further adjustment.

A further object is to adjustably mount the dial so its indicia may be adjusted in relation to the indicator hand after the top center of the piston has been established.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a perspective view of the top center indicator.

Figure 2 is a vertical transverse sectional view through a portion of the cylinder and piston, showing the indicator applied thereto with the face plate removed.

Figure 3 is a rear view of the dial plate, showing the adjustment thereof.

Referring to the drawing, the numeral 1 designates the cylinder of a conventional form of internal combustion engine, 2 the piston therein, and 3 the connecting rod, connected to the wrist pin 4 in the usual manner.

Above the piston and in one side of the cylinder is a spark plug opening 5 for the reception of a spark plug, and the top center, hereinafter set forth, is adapted to be supported within the opening 5.

The indicator comprises an elongated casing 6 having secured thereto by means of screws 7 a plate 8, which plate, in turn, is provided with a slotted extension 9 forming spring arms 10, adapted to be forced into the threaded spark plug opening 5, shown in Figure 2, for rigidly supporting the device.

Pivotally mounted within the chamber 11 of the casing 6 adjacent the outer end of the casing is an upwardly extending indicator hand 12, which cooperates with a scale 13 on the adjustable dial 14. The rear side of the casing is provided with an upwardly extending ear 15 having a threaded stud 16 which extends through an arcuate slot 17 in the dial 14 so that the dial can be adjusted to the right or left on its pivotal point 18, and may be clamped in adjusted position by means of a thumb nut 19; the purpose of which will presently appear. Pivotally mounted at 20 in the inner end of the chamber 11 is a bell crank 21. The bell crank 21 has its arm 22 extending upwardly and provided with a link connection 23 to the indicator hand 12 so that when said bell crank 21 is moved the indicator hand 12 will move in relation to the scale 13, for indicating the position of the piston 2.

The other arm 24 of the bell crank 21 is relatively long and extends through the vertical alined slots 10a of the slotted extension 9, and terminates above the piston 2. Pivotally mounted at 24a on the outer end of the bell crank arm 24 is a downwardly curved adjustable arm 25, the lower end 26 of which is adapted to be engaged by the piston 2 at its upward limit of movement for indicating on the scale 13. During this operation the engine is slowly turned over and as the crank approaches the top center the movement of the piston is relatively slow. After the crank and piston have been properly positioned for the top center by observing the oscillations of the hand, the thumb nut 19 is loosened and the dial moved so that its zero point will register with the hand, therefore it will be seen that when the device is moved from the engine it may be applied to a similar engine without further adjustment. The arm 25 is locked in its adjusted position by means of a set screw 27 which extends through the arcuate slot 28 in the arm and into the arm 24 of the bell crank. The arm 24 is normally forced downwardly by the spring 29, which is anchored at 30 to the line 23, and at 31 at a fixed point within the chamber 10 of the casing.

In positioning the indicator the piston 2 is preferably moved downwardly below the spark plug opening 5 so the piston will not engage the arm 25. Following this operation the engine is manually turned over until the piston 2 moves upwardly into engagement with the arm 25 for moving the indicator hand 12, against the spring action 29. When the piston reaches a dead top center or position and passes this position the indicator hand will start to move in the opposite direction, hence it will be seen that the top dead center will be established and the dial can be adjusted in relation to the hand, and that then the crank can be slowly turned back to a certain number of degrees to check the valve openings or set the timing.

The invention having been set forth what is claimed as new and useful is:

1. A top center indicator adapted to be inserted through a spark plug opening in a cylinder in the path of a piston, said indicator comprising a casing, an expansible member carried by said casing and frictionally supporting the casing in the spark plug opening, a dial carried by the casing, a pointer cooperating with indicia on the dial, a bell crank within the casing, one arm of the bell crank having a link connection with the pointer, the other arm of the bell crank lever extending through the expansible member and terminating in the path of the piston.

2. A device as set forth in claim 1 including means for adjusting the dial and scale thereon in relation to the pointer hand and spring means for normally forcing said hand in one direction, whereby the arm of the bell crank extending into the cylinder will move upwardly or downwardly according to the movement of the piston.

3. A device as set forth in claim 1 including a piston engaging arm carried by one of the bell crank arms and means for adjusting said piston engaging arm upwardly and downwardly.

4. The combination with a top center indicator for pistons within a cylinder and having means adapted to extend through a spark plug opening into engagement with the piston, of a supporting means for said indicator frictionally engaged within the spark plug opening, said supporting means comprising spaced spring arms forming a horizontal slot and a vertical slot, said piston engaging means being vertically movable in the vertical slot.

5. A top center indicator adapted to be inserted through a spark plug opening in a cylinder in the path of a piston at an angle to the axis of the piston, said indicator comprising a mechanism supporting member to one side of the cylinder, a supporting member carried by said mechanism carrying member and disposed in the spark plug opening, a dial carried by the mechanism supporting member, a pointer cooperating with indicia on the dial, a bell crank carried by the mechanism supporting member, one arm of the bell crank having a link connection with the pointer, the other arm of the bell crank lever extending through the supporting member in the spark plug opening and terminating in the path of the piston.

BENJAMIN F. PALMER.